(12) United States Patent
Morrison et al.

(10) Patent No.: US 8,924,431 B2
(45) Date of Patent: Dec. 30, 2014

(54) PLUGGABLE DOMAIN-SPECIFIC TYPING SYSTEMS AND METHODS OF USE

(75) Inventors: Rick Morrison, Palo Alto, CA (US);
Jud Gardner, Palo Alto, CA (US);
Matthew Saffer, Palo Alto, CA (US)

(73) Assignee: Comprehend Systems, Inc., Redwood City, CA (US)

( * ) Notice: Subject to any disclaimer, the term of this patent is extended or adjusted under 35 U.S.C. 154(b) by 39 days.

(21) Appl. No.: 13/251,132

(22) Filed: Sep. 30, 2011

(65) Prior Publication Data

US 2013/0086115 A1 Apr. 4, 2013

(51) Int. Cl.
*G06F 17/30* (2006.01)

(52) U.S. Cl.
CPC .............................. *G06F 17/30294* (2013.01)
USPC .......................................... 707/803; 707/809

(58) Field of Classification Search
CPC ................... G06F 17/30294; G06F 17/30292; G06F 17/30297
USPC .................................................. 707/803, 809
See application file for complete search history.

(56) References Cited

U.S. PATENT DOCUMENTS

| 6,366,916 | B1 | 4/2002 | Baer et al. |
| 7,496,593 | B2 | 2/2009 | Gardner et al. |
| 7,693,900 | B2 | 4/2010 | Wilmering et al. |
| 7,702,636 | B1 | 4/2010 | Sholtis et al. |
| 7,853,576 | B2 | 12/2010 | Narang et al. |
| 7,962,512 | B1 | 6/2011 | Sholtis et al. |
| 8,078,647 | B2 | 12/2011 | Liang et al. |
| 8,103,740 | B1 * | 1/2012 | Abramov et al. ............. 709/217 |
| 8,108,366 | B2 | 1/2012 | Dettinger |
| 8,234,312 | B2 | 7/2012 | Thomas |
| 8,250,101 | B2 | 8/2012 | Fot et al. |
| 8,255,871 | B1 | 8/2012 | Kompella et al. |
| 2002/0198891 | A1 | 12/2002 | Li et al. |
| 2003/0217069 | A1 | 11/2003 | Fagin et al. |
| 2005/0050519 | A1 | 3/2005 | Schulte et al. |
| 2005/0240354 | A1 | 10/2005 | Mamou et al. |
| 2005/0267901 | A1 | 12/2005 | Irlen |

(Continued)

FOREIGN PATENT DOCUMENTS

| EP | 2761425 | 8/2014 |
| WO | WO2013048828 | 4/2013 |
| WO | WO2013048829 | 4/2013 |

OTHER PUBLICATIONS

Data Sheet entitled "Comprehend Clinical", by Comprehend, Copyright 2011.*

(Continued)

*Primary Examiner* — Mahesh Dwivedi
(74) *Attorney, Agent, or Firm* — Carr & Ferrell LLP

(57) ABSTRACT

Systems and methods for generating pluggable domain-specific data types are provided herein. According to some embodiments, methods for generating pluggable domain-specific data types may include determining a schema for the domain-specific data type, the schema including a data protocol that defines how data units are to be encoded into a domain-specific data unit, the domain-specific data unit including two or more data units received from one or more data sources, generating the domain-specific data type utilizing the determined schema, the domain-specific data type having a pluggable format such that the domain-specific data type may be utilized by a third-party application, and storing the domain-specific data type in a pluggable domain-specific data type library.

20 Claims, 5 Drawing Sheets

(56) References Cited

U.S. PATENT DOCUMENTS

| | | |
|---|---|---|
| 2007/0294323 A1 | 12/2007 | Narang et al. |
| 2008/0016502 A1 | 1/2008 | Henderson et al. |
| 2008/0256364 A1 | 10/2008 | Chang et al. |
| 2009/0187594 A1 | 7/2009 | Chen et al. |
| 2009/0240726 A1 | 9/2009 | Carter et al. |
| 2010/0077007 A1 | 3/2010 | White et al. |
| 2010/0251097 A1 | 9/2010 | Vincent, III |
| 2010/0287158 A1 | 11/2010 | Toledano et al. |
| 2011/0288877 A1 | 11/2011 | Ofek et al. |
| 2012/0047425 A1 | 2/2012 | Ahmed |
| 2013/0086104 A1 | 4/2013 | Morrison et al. |

OTHER PUBLICATIONS

Article entitled "Comprehend Systems Wants to Make Data Analysis Less of a Pain" by Tsotsis, dated Feb. 27, 2011.*

International Search Report and Written Opinion mailed Nov. 30, 2012 in Application No. PCT/US12/55953.

International Search Report and Written Opinion mailed Nov. 30, 2012 in Application No. PCT/US12/55947.

* cited by examiner

PLUGGABLE DOMAIN-SPECIFIC TYPING SYSTEMS AND METHODS OF USE

CROSS-REFERENCE TO RELATED APPLICATIONS

This nonprovisional patent application is related to nonprovisional U.S. patent application Ser. No. 13/251,149, filed on Sep. 30, 2011, entitled "SYSTEMS AND METHODS FOR GENERATING SCHEMAS THAT REPRESENT MULTIPLE DATA SOURCE," which is hereby incorporated by reference in its entirety.

FIELD OF THE INVENTION

The present technology relates generally to domain-specific typing, and more specifically, but not by way of limitation, to pluggable domain-specific typing systems, the generation of domain-specific data units, as well as methods of use.

BACKGROUND

Data may have one or more associated data types. Such data types may help to identify the classification of the data. Furthermore, operations can be conducted on data and may be determined, in part, by the associated data type of the data.

SUMMARY OF THE PRESENT TECHNOLOGY

According to some embodiments, the present technology may be directed to methods for generating pluggable domain-specific data types. The methods may include: (a) determining a schema for the domain-specific data type, the schema including a data protocol that defines how data units are to be encoded into a domain-specific data unit, the domain-specific data unit including two or more data units received from one or more data sources; (b) generating the domain-specific data type utilizing the determined schema, the domain-specific data type having a pluggable format such that the domain-specific data type may be utilized by a third-party application; (c) storing the domain-specific data type in a pluggable domain-specific data type library; and (d) sharing those domain-specific data type libraries with other users or systems.

According to other embodiments, the present technology may be directed to systems for generating domain-specific data types. The systems may include: (a) a memory for storing executable instructions; (b) a processor for executing the instructions, the instructions including: (i) a typing generator module that: (1) establishes a schema for the domain-specific data type, the schema including a data protocol that defines how data units are to be encoded into a domain-specific data unit, the domain-specific data unit including two or more data units received from one or more data sources; (2) generates the domain-specific data type utilizing the determined schema, the domain-specific data type having a pluggable format such that the domain-specific data type may be utilized by a third-party application; (3) stores the domain-specific data type in a pluggable domain-specific data type library; and (4) creating a mechanism for sharing these domain-specific data type libraries with other users or systems.

According to additional embodiments, the present technology may be directed to non-transitory computer readable storage media having a program embodied thereon, the program being executable by a processor to perform a method for generating domain-specific data types.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION

Figure 1:
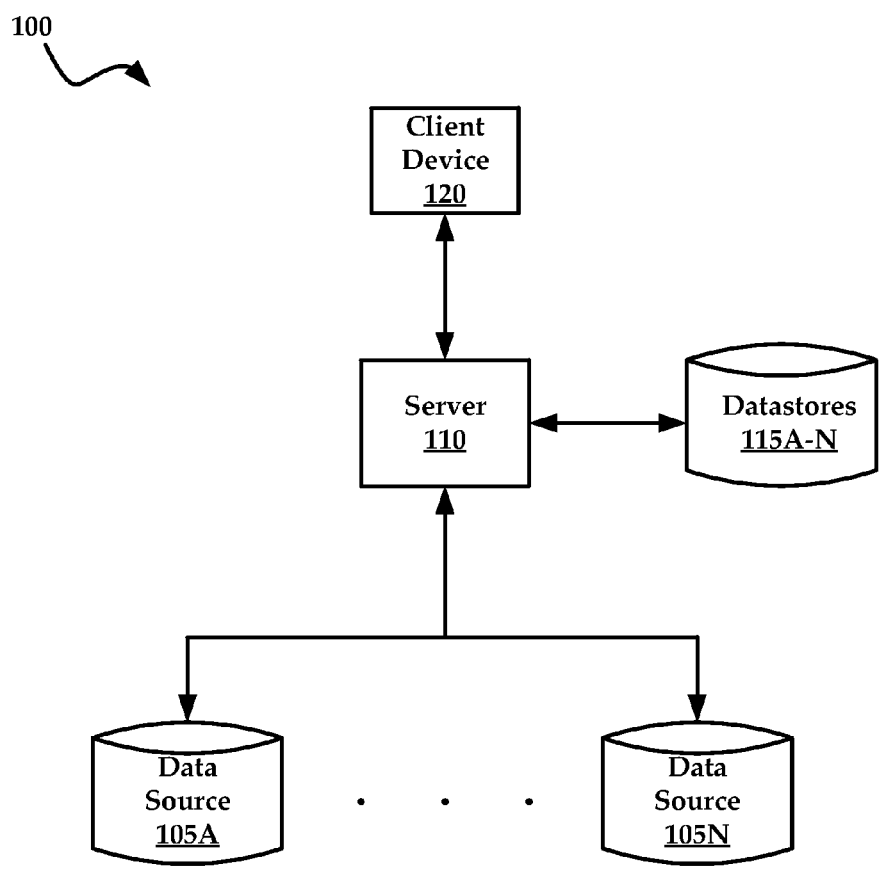
FIG. 1 is a block diagram of an exemplary system architecture for practicing aspects of the present technology.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Generally speaking, the present technology relates to the creation and utilization of domain-specific data types. Commonly utilized databases and database schemas store data units as primitives within cells. In contrast, the present technology may generate pluggable domain-specific data types that may be utilized by third party applications, in addition to, or in place of, data stored in primitive formats. These domain-specific data types can be collected into libraries, which can similarly be plugged into other third party applications.

The domain-specific data type may define a data schema for arranging or encoding data units into more complex domain-specific data units of data. It is noteworthy to mention that a schema may include an abstraction or abstract representation of a set of data, such as a data structure. For example, a data structure may include table of data, a graph, data tree, and so forth. The data structure may include a plurality of data units arranged according to the data structure. For example, the domain-specific data type may utilize the Health Level 7 ("HL7") protocol. Additionally, the present technology may allow end users to generate and propagate new data types for any domain.

As stated above, the present technology may store combinations of data units as a single domain-specific data unit, according to a particular schema. These domain-specific data types contain much more complex data types than are commonly utilized by current database systems and schemas.

It will be understood that in the context of the present technology, the term "data unit" may be understood to include a primitive integer or any size or type of data, such as character strings, image files, combinations of different data types and formats, and so forth.

For example, a blood pressure reading is comprised of two separate numbers. Common database schemas store these values as two separate primitives within a datastore (e.g., database). In contrast, the present technology allows for the combination of these two primitives into a single domain-specific data unit that represents the blood pressure of a patient. While this simple example illustrates a basic premise, it will be understood that domain-specific data types of even greater complexity may be created. For example, an electrocardiogram, which may include hundreds or thousands of data points, may be combined into any domain-specific data unit.

The present technology also contemplates the ability to assign units of measurement to the domain-specific data types, convert from one domain-specific data type into other domain-specific data types, and convert to and/or from non domain-specific data structures (e.g., SQL or other relational database management system) to a domain-specific data type.

Additionally, the present technology may employ metadata audit trails in the creation, conversion, or other application of these domain-specific data types. For example, these metadata audit trails create a record that explains how a domain-specific data unit was created or converted. Metadata can be useful in resolving conflicts that arise during the conversion of one domain-specific data type into another domain-specific data type, or into non domain-specific data structures.

FIG. 1 illustrates an exemplary system architecture 100 for practicing aspects of the present technology. The architecture 100 may include a plurality of data sources, such as data sources 105A-N. Generally speaking, these data sources may include any of a database, a data stream, a data file, or any other mechanism for storing or organizing data in a structured format. Each of the data sources 105A-N may have a different data structure for storing data points in a particular format.

The data structures 105A-N may be communicatively coupleable to a server 110 that includes executable instructions for generating domain-specific data types from data units received from the data sources 105A-N, processing the domain specific data types, and storing these data types in one or more domain-specific data stores 115A-N. The server 110 may communicatively couple with the data sources 105A-N via any of a number of private or public communications media such as the Internet.

It is noteworthy to mention that the domain-specific datastores 115A-N may include any of a database, a cache, a flat file, some combination of each, and so forth.

It will be understood that in some embodiments, the architecture 100 may include a plurality of servers (such as web server 110) arranged into a cloud-based computing environment. According to some embodiments, the cloud-based computing environment generates and processes domain-specific data types. In general, a cloud-based computing environment is a resource that typically combines the computational power of a large grouping of processors and/or that combines the storage capacity of a large grouping of computer memories or storage devices. For example, systems that provide a cloud resource may be utilized exclusively by their owners, such as Google™ or Amazon™; or such systems may be accessible to outside users who deploy applications within the computing infrastructure to obtain the benefit of large computational or storage resources.

The cloud may be formed, for example, by a network of servers with each server (or at least a plurality thereof) providing processor and/or storage resources. These servers may manage workloads provided by multiple users (e.g., cloud resource customers or other users). Typically, each user may place workload demands upon the cloud that vary in real-time, sometimes dramatically. The nature and extent of these variations typically depend on the type of business associated with the user.

A client device 120 may communicatively couple with the server 110 via an application programming interface ("API"). Generally speaking, an API allows multiple types of programs access to programmatic resources, sometimes written in different languages, across network boundaries, and so forth. An API may be used on the same platform in the same language. Nevertheless it is used to allow two different programs to inter-operate. Client device 120 may access the domain-specific datastore 115 via the server 110. Domain-specific data types may be exported to the client device 120.

Figure 2:
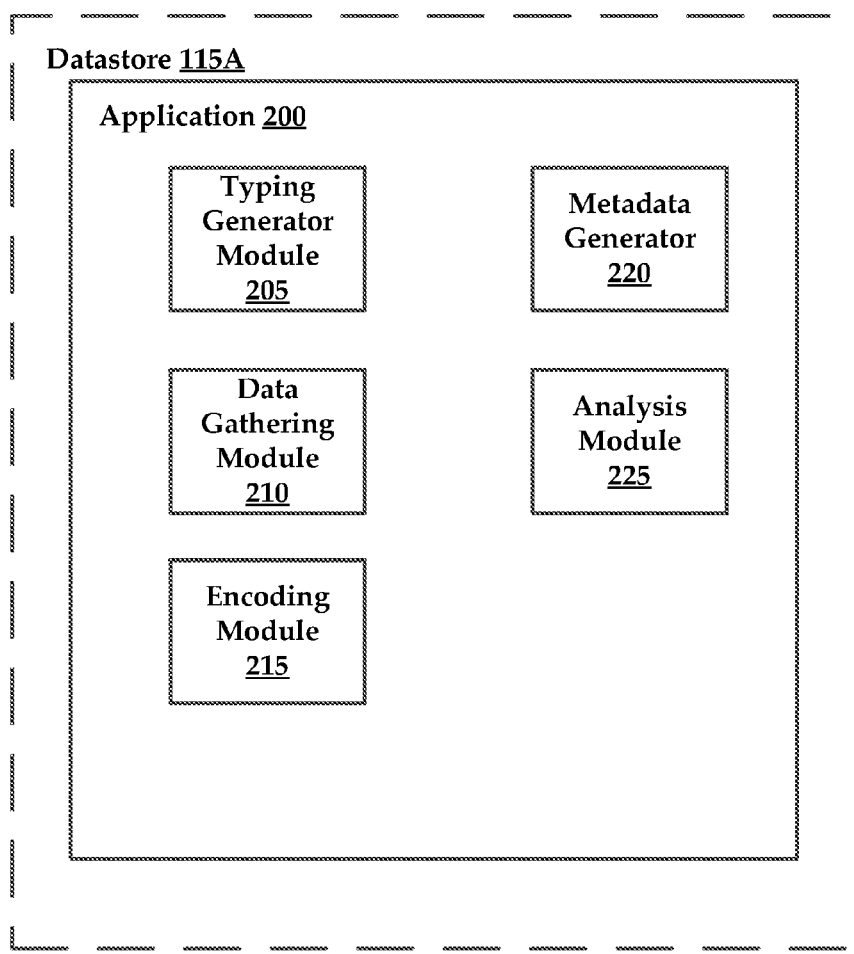
FIG. 2 is a block diagram of an exemplary application for generating pluggable domain-specific data types.

FIG. 2 illustrates a block diagram of one of the domain-specific datastores 115A-N that includes a domain-specific typing application, hereinafter referred to as "application 200." According to some embodiments, the application 200 may include one or more modules or engines that are adapted to effectuate respective functionalities attributed thereto. It will be understood that the processor of a computing device associated with the domain-specific datastore may execute one or more of the constituent modules described herein.

Additionally, it will be understood that the application 200 may be distributed to and executed by any of the server 110, the cloud-based environment, or optionally via client device 120.

As used herein, the term "module" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality. In other embodiments, individual modules of the application 200 may include separately configured servers (e.g., web server 110) that interact with the domain-specific datastores 115A-N.

In some embodiments, the application 200 may include a typing generator module 205, a data gathering module 210, an encoding module 215, a metadata generator 220, and an analysis module 225. It is noteworthy that the application 200 may include additional modules, engines, or components, and still fall within the scope of the present technology.

The typing generator module 205 may be executed to create a pluggable domain-specific data type. The pluggable domain-specific data type may provide a framework or blueprint for creating domain-specific data units, as will be described in greater detail below. According to some embodiments, a plurality of pluggable domain-specific data types may be grouped together and stored as a library. These groups may include similar domain-specific data types. For example a library of healthcare related domain-specific data types may include several versions of domain-specific data types for the HL7 protocol. That is, the library may include many versions of the HL7 protocol, such as HL7.v1 (version one), HL7.v2 (version 2), and so forth. Additionally, the library may include combinations of domain-specific data types, such as versions of HL7 and CDISC protocols.

In general, to create a pluggable domain-specific data type, an end user may specify a schema or protocol that governs the creation of the domain-specific data unit, also referred to as an "atomic unit." In some embodiments, the domain-specific data data unit may include a single value that represents the combination of a plurality of data units. The term "combination" may be understood to include aggregation, concatenation, summation, encoding, or any other method for processing together a plurality of data units to produce a single data unit, such as a value. Again, the schema represents an abstraction of a data structure (for example, a blood pressure reading that includes two integers). The schema determines the types of data units of which the domain-specific data unit will be comprised. Therefore, a domain-specific data type of "blood pressure" may be utilized to create a domain-specific data unit that is comprised of the combination of two primitive integers into a single data unit.

End users may interact with the application 200 to create these pluggable domain-specific data types via one or more user interfaces (such as a graphical user interface, command line interface, and so forth) generated by the application 200. In other embodiments end users may upload previously generated domain-specific data types that may be stored or arranged into a library by the typing generator module 205.

In another example, a schema may include an abstraction of a typical data source that utilizes HL7 and CDISC protocols or any other protocol. The schema may specify the units of measurement for the domain-specific data unit. Understanding the units of measurement may allow for the conversion or transformation (e.g., normalization) of the individual data units before combining or encoding of the data units into the domain-specific data unit. Normalization ensures that the domain-specific data unit includes only similarly defined data units (e.g., data units with identical units of measurement). Additionally, units of measurement may allow for the conversion of data units or domain-specific data units into other types of data units or domain-specific data units. For example, complex "total cholesterol" data type may require the conversion of three different components (e.g., LDL, HDL, and Triglycerides) of cholesterol into the same units of measurement before the three components may be combined together to generate "total cholesterol" data type.

In another example, a domain-specific data type may include an average blood pressure reading over a period of time. Therefore, the domain-specific data unit not only includes combinations of primitive integers, but the blood pressure readings have a temporal aspect associated therewith.

It can be appreciated that other types of information or data may also be included in the domain-specific data unit such as geographical information. Moreover, domain-specific data types may include, but are not limited to, other complex types of data such as tuples, series, date series, temporal types, aggregate comparisons, and so forth. Therefore, it can be envisioned that domain-specific data units may include many other types of aggregatable, combinable or otherwise encodeable data units.

The domain-specific data types are configured to "plug" into one or more third-party applications, such as a legacy relational database management system, or any one of a number of applications that may utilize a domain-specific data type(s). For example, a healthcare management application may employ many of the pluggable domain-specific data types that utilize protocols specifically tailored for use in the healthcare industry (e.g., HL7, CDISC, and so forth). Domain-specific data types may plug into legacy applications because the domain-specific data type may include instructions or metadata that instruct the legacy application in the creation or utilization of domain-specific data units.

Rather than being restricted to utilizing primitive data types, these legacy systems may now employ the domain-specific data types of the present technology to create and utilize domain-specific data units. These domain-specific data units include more complex and robust data than simple primitive data units stored in conventional database systems.

In some embodiments, the typing generator module 205 is further configured to establish behavioral characteristics for the schema. The behavioral characteristics may determine how the domain-specific data units behave relative to one or more standard operations. For example, the typing generator module 205 may determine if a domain-specific data unit can be added, subtracted, or multiplied with one or more additional domain-specific data units.

Upon determining the schema for the domain-specific data type, the data gathering module 210 may be executed to obtain data units from the data sources 105A-N. It will be understood that in some embodiments the schema may provide information as to the location of acceptable data sources for the desired data units. In other embodiments, data units may be obtained by searching a plurality of data sources to locate data units that correspond to the required data units prescribed in the schema. For example, assuming the domain-specific data type is directed to a combination of product prices for a particular product, the data gathering module 210 may search a plurality of e-commerce websites (e.g., data sources) for price values associated with a particular product. The plurality of e-commerce websites may be input into the schema via an end user, or may be determined by the data gathering module 210 searching for individual data sources via the Internet.

Once obtained, the data units may be encoded into a domain-specific data unit according to the schema provided. Again, prior to combining the data units, it may be necessary to convert one or more of the data units into the units of measurement specified for the domain-specific data type. For example, to generate a domain-specific data type of "total cholesterol," the typing generator module 205 may convert one or more of the three data units of cholesterol (e.g., low density lipoprotein ("LDL"), high density lipoprotein ("HDL"), and triglycerides), if necessary, in order to combine these three data units into a domain-specific data unit of "total cholesterol."

In some instances, data units may require normalization before they can be encoded as a domain-specific data unit. For example, a primitive integer equal to the age of the individual may depend upon country of origin. In one country, an age equal to the first year of life may be represented by zero, while in other countries an age equal to the first year of life may be represented by the numeral one. Therefore, the analysis module 225 may be executed to evaluate the data units and determine if normalization needs to occur before the data units can be encoded together. Returning back to the example, the analysis module 225 may determine that age values received from a particular data source need to be normalized before encoding. This determination may result from evaluating metadata associated with the data source, the data unit, or may be inferred from indirect information such as an analysis of the language in which age value is stored.

To normalize the data units for countries that represent the first year of life with zero, the analysis module 225 may add a single digit to the age value before encoding of the data units. In some embodiments, the analysis module 225 may allow for the creation and application of arbitrary or end user defined functions in the normalization or transformation of data units. For example, the normalization of data units such as image files may include adjusting the contrast of each of the image files before performing additional processes on the image files.

Once the data units have been prepared for encoding, the encoding module 215 aggregates, combines, or otherwise groups the data units together into a domain-specific data unit according to the schema created by the typing generator module 205. As stated above, the schema provides not only a blueprint as to which data units should be selected and how the data units should be converted or normalized before encoding, but also the protocol to which the domain-specific data unit should adhere.

During one or more of the aforementioned processes, the metadata generator 220 may be executed to generate and append metadata to any of the data sources 105A-N, the data units, the domain-specific data unit, or any other data type.

In some embodiments, the metadata generator 220 may generate a metadata audit trail that includes information regarding the origin of the data units, the schema, any normalizations or modifications made to the data units, units of measurement for the domain-specific data unit, along with any other historical information regarding the encoding of the data units into a domain-specific data unit to create the domain-specific data type. The metadata generator 220 may overlay or associate metadata with any object disclosed herein.

In some embodiments, the metadata audit trail for a domain-specific data unit may be utilized to decode the domain-specific data unit into its constituent data units. That is, because the metadata audit trail includes a history of the operations that are performed on the data units to encode them into a domain-specific data unit, that information can be utilized to reverse engineer the data units and return them to their primitive state.

The ability of the application 200 to reverse engineer the domain-specific data unit allows the present technology to convert data units from simple database systems, such as SQL, into domain-specific data types and vice-versa. Therefore, the application 200 may be fully compatible with a variety of presently available relational database management systems.

In use, these domain-specific data types allow end users to perform more robust and valuable functions with these complex data types, as opposed to utilizing primitive data stored in cells in a typical relational database management system. Rather than having to process individual primitives to analyze or interpret data units, functions performed on domain-specific data units encoded in accordance with the present disclose may provide far more complex and detailed data studies without requiring the tedious processing of each primitive data unit.

Advantageously, the domain-specific data types provided herein may be as broad or granular as desired. For example, a domain-specific data unit may include hundreds or thousands of data units that have been processed and encoded, while other domain-specific data units may comprise only a few data units.

By way of a non-limiting example, a domain-specific data type of "motor health" may provide information as to the overall health of a mechanical motor. The individual data units for the motor may include information, such as hours in service, average workload, and so forth. These data units may be processed and encoded into a domain-specific data unit. With respect to performing a function with the domain-specific data unit, the domain-specific data unit may be comparatively analyzed against an efficiency factor to determine if the motor is operating at a desired capacity. This may occur by statistically evaluating the domain-specific data unit or inputting the domain-specific data unit into an equation that defines the efficiency of the motor. The domain-specific data units may be normalized against geographical information. For example, it may be well known that a motor may be expected to perform more efficiently at a higher altitude.

Figure 3:
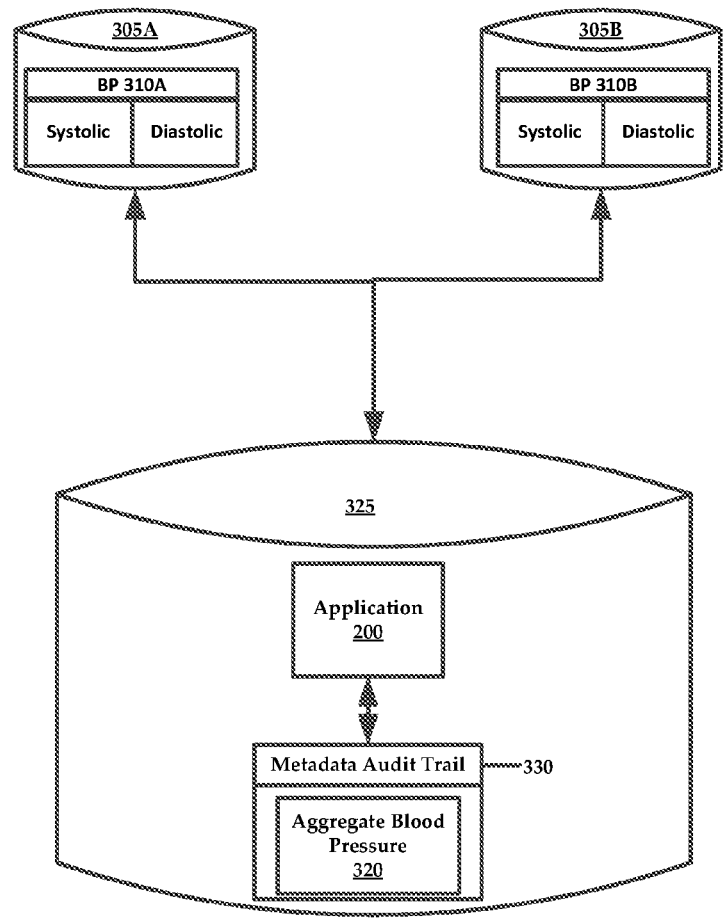
FIG. 3 is a schematic representation of the generation of a domain-specific data unit utilizing a pluggable domain-specific data type.

FIG. 3 illustrates an exemplary encoding/decoding of data units and domain-specific data unit. Data source 305A includes blood pressure data units 310A for blood pressure readings. Data source 305B includes blood pressure data units 310B for blood pressure readings. All blood pressure readings include primitive integers that correspond to diastolic and systolic readings. These data units 310A and 310B are retrieved by the application 200 to establish a domain-specific data type "aggregate blood pressure."

A domain-specific data unit 320 of aggregate blood pressure is created by processing the data units 310A and 310B via the application 200 as described above. The domain-specific data unit 320 may be stored in the datastore 325. A metadata audit trail 330 is created and associated with the domain-specific data unit 320 (e.g., aggregate blood pressure for example) that details how the omain-specific data unit was encoded. More specifically, the audit trail may include information such as the origin of the data unit (e.g., data source from which the data unit was retrieved), any normalization or conversion performed on the data units, along with any other pertinent historical information regarding the creation of the domain-specific data unit or the attributes of the data units.

Figure 4:
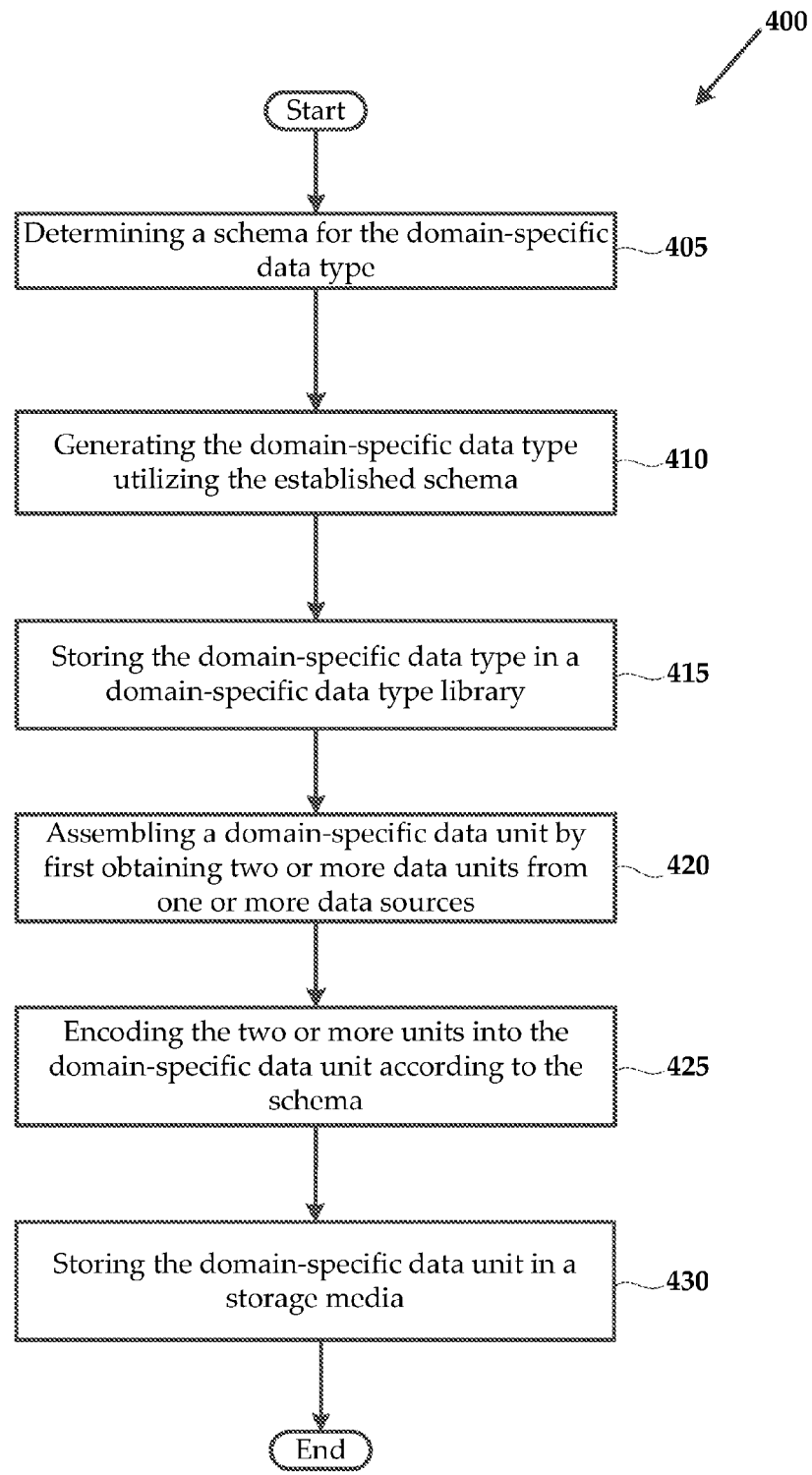
FIG. 4 illustrates a flowchart of an exemplary method for generating a pluggable domain-specific data type and a domain-specific data unit.

FIG. 4 illustrates a flowchart of an exemplary method 400 for generating a pluggable domain-specific data type. The method may begin with a step 405 of determining a schema for the domain-specific data type. It will be understood that the schema may include a data protocol that defines how data units are to be encoded into a domain-specific data unit. Additionally, the domain-specific data unit may include two or more data units that are received from one or more data sources.

The determining of the schema may occur via end user input, schema templating, machine learning techniques, or other mechanisms or processes that would be known to one of ordinary skill in the art with the present disclosure before them. In case of end user creation of the schema, the step of determining includes the receipt of the schema.

After establishing the schema, the method 400 may include a step 410 of generating the domain-specific data type utilizing the determined schema. It will be understood that the domain-specific data type may include a pluggable format such that the domain-specific data type may be utilized by a third-party application.

Next, the method may include the step 415 of storing the domain-specific data type in a pluggable domain-specific data type library. Again, the library may include many similar or related domain-specific data types, or versions of a primary schema.

The method 400 may optionally include a step 420 of assembling a domain-specific data unit by first obtaining two or more data units from one or more data sources. The schema may provide information as to the location of acceptable data sources. In other embodiments, data units may be obtained by searching a plurality of data sources to locate data units that correspond to the required data units prescribed in the schema.

Next, the method 400 may include a step 425 of encoding the two or more units into the domain-specific data unit according to the schema, and finally a step 430 of storing the domain-specific data unit in a storage media.

Figure 5:
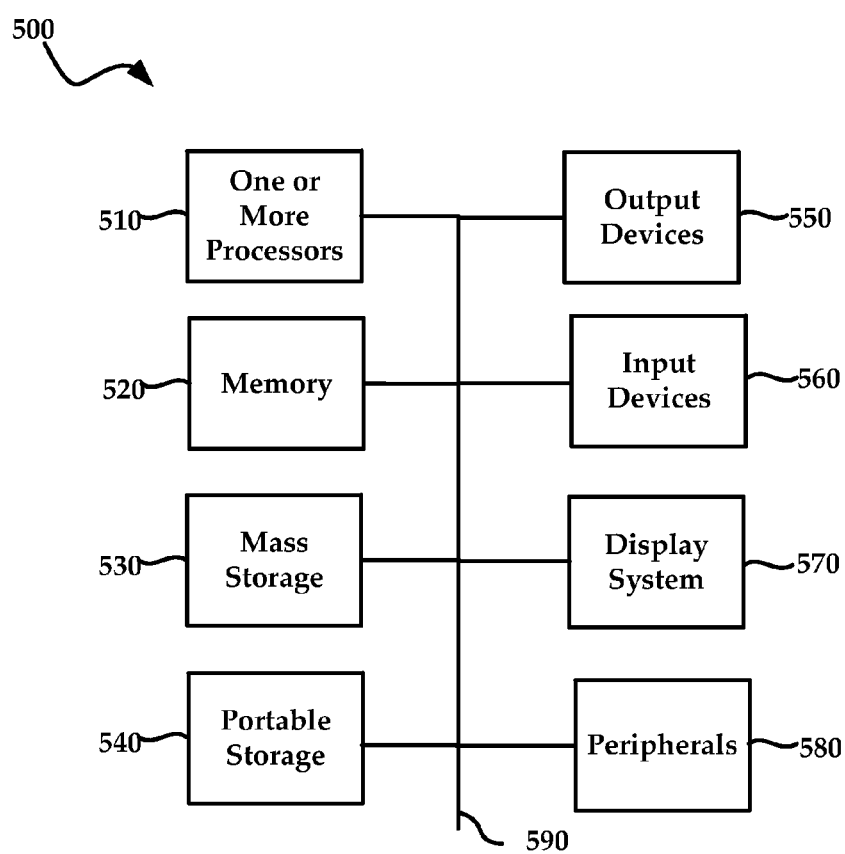
FIG. 5 illustrates an exemplary computing system that may be used to implement embodiments according to the present technology.

FIG. 5 illustrates an exemplary computing system 500 that may be used to implement an embodiment of the present technology. The computing system 500 of FIG. 5 may be implemented in the contexts of the likes of computing systems, networks, servers, or combinations thereof. The computing system 500 of FIG. 5 includes one or more processors 510 and memory 520. Memory 520 stores, in part, instructions and data for execution by processor 510. Memory 520 may store the executable code when in operation. The system 500 of FIG. 5 further includes a mass storage device 530, portable storage medium drive(s) 540, output devices 550, user input devices 560, a graphics display 570, and peripheral devices 580.

The components shown in FIG. 5 are depicted as being connected via a single bus 590. The components may be connected through one or more data transport means. Processor unit 510 and memory 520 may be connected via a local microprocessor bus, and the mass storage device 530, peripheral device(s) 580, portable storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 may store the system software for implementing embodiments of the present technology for purposes of loading that software into memory 520.

Portable storage device 540 operates in conjunction with a portable non-volatile storage medium, such as a floppy disk, compact disk, digital video disc, or USB storage device, to input and output data and code to and from the computing system 500 of FIG. 5. The system software for implementing embodiments of the present technology may be stored on such a portable medium and input to the computing system 500 via the portable storage device 540.

Input devices 560 provide a portion of a user interface. Input devices 560 may include an alphanumeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Suitable output devices include speakers, pinters, network interfaces, and monitors.

Display system 570 may include a liquid crystal display (LCD) or other suitable display device. Display system 570 receives textual and graphical information, and processes the information for output to the display device.

Peripherals 580 may include any type of computer support device to add additional functionality to the computing system. Peripheral device(s) 580 may include a modem or a router.

The components provided in the computing system 500 of FIG. 5 are those typically found in computing systems that may be suitable for use with embodiments of the present technology and are intended to represent a broad category of such computer components that are well known in the art. Thus, the computing system 500 of FIG. 5 may be a personal computer, hand held computing system, telephone, mobile computing system, workstation, server, minicomputer, mainframe computer, or any other computing system. The computer may also include different bus configurations, networked platforms, multi-processor platforms, etc. Various operating systems may be used including Unix, Linux, Windows, Macintosh OS, Palm OS, Android, iPhone OS and other suitable operating systems.

It is noteworthy that any hardware platform suitable for performing the processing described herein is suitable for use with the technology. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEPROM, and any other memory chip or cartridge.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method for generating a pluggable domain-specific data type, the method comprising:
   determining a schema for the domain-specific data type, the schema including a data protocol that defines how data units are to be encoded into a domain-specific data unit and locations of a plurality of acceptable data sources, the domain-specific data unit including first data unit having a first unit of measure and a second data unit having a second unit of measure, the first and second data units;
   assigning a third unit of measure to the domain-specific data unit, the third unit of measure based upon the first and second units of measure;
   generating the domain-specific data type utilizing the determined schema, the domain-specific data type having a pluggable format such that the domain-specific data type may be utilized by a third-party application; and
   storing the domain-specific data type in a pluggable domain-specific data type library, the pluggable domain-specific data type being at least one of transferable to other applications or incorporable into other domain-specific data type libraries.

2. The method according to claim 1, further comprising:
   assembling a domain-specific data unit by:
      searching the plurality of acceptable data sources to locate a plurality of the first and second data units;
      obtaining the first and second data units from the plurality of acceptable data sources;
      encoding the first and second data units into the domain-specific data unit according to the schema; and
   storing the assembled domain-specific data unit in a storage media.

3. The method according to claim 1, wherein the data units may include any of a primitive, a tuple, a series, a date series, a temporal type, an aggregate comparison of primitives, geographical data, pre-existing data units, and combinations thereof.

4. The method according to claim 1, further comprising decoding the domain-specific data unit into data units utilizing the schema such that the data units may be stored in a legacy data source.

5. The method according to claim 1, wherein encoding further includes associating a metadata audit trail with the domain-specific data unit, the metadata audit trail including information that corresponds to at least one of the two or more data units, the one or more data sources, the combination of the two or more units, and the storage of the domain-specific data unit.

6. The method according to claim 1, further comprising decoding the domain-specific data unit to recover the two or more data units utilizing the metadata audit trail.

7. The method according to claim 1, further comprising establishing units of measurement for each of a plurality of data units.

8. The method according to claim 7, further comprising converting a first domain-specific data unit into a second domain-specific data unit utilizing the units of measurement for both the first and second domain-specific data units.

9. The method according to claim 1, further comprising normalizing at least one of the two or more data units before the step of encoding.

10. The method according to claim 1, further comprising establishing behavioral characteristics for the schema, the behavioral characteristics determining how the domain-specific data units behave relative to one or more standard operations.

11. The method according to claim 1, further comprising performing an evaluative function with one or more domain-specific data units.

12. A system for generating a pluggable domain-specific data type, the system comprising:
a memory for storing executable instructions;
a processor for executing the instructions, the instructions including:
a typing generator module that:
establishes a schema for the domain-specific data type, the schema including a data protocol that defines how data units are to be encoded into a domain-specific data unit, the domain-specific data unit including a first data unit having a first unit of measure and a second data unit having a second unit of measure, the first and second data units received from one or more data sources;
assigns a third unit of measure to the domain-specific data unit, the assignment of the third unit of measure based upon the first and second units of measure;
generates the domain-specific data type utilizing the determined schema, the domain-specific data type having a pluggable format such that the domain-specific data type may be utilized by a third-party application; and
stores the domain-specific data type in a pluggable domain-specific data type library.

13. The system according to claim 12, further comprising:
a data gathering module that:
searches the plurality of acceptable data sources to locate a plurality of the first and second data units, and
obtains the first and second data units from the plurality of acceptable data sources; and
an encoding module that encodes the first and second data units into a domain-specific data unit according to the schema and stores the encoded domain-specific data unit in a storage media.

14. The system according to claim 12, wherein the data units may include any of a primitive, a tuple, a series, a date series, a temporal type, an aggregate comparison of primitives, geographical data, and combinations thereof.

15. The system according to claim 12, further comprising a metadata generator that generates a metadata audit trail for the domain-specific data unit, the metadata audit trail including information that corresponds to at least one of the two or more data units, the one or more data sources, the combination of the two or more units, and the storage of the domain-specific data unit.

16. The system according to claim 15, wherein the encoding module decodes the domain-specific data unit to recover the two or more data units utilizing at least one of the schema and the metadata audit trail.

17. The system according to claim 12, wherein the typing generator module establishes units of measurement for each of the data units.

18. The system according to claim 17, further comprising an analysis module that converts a first domain-specific data unit into a second domain-specific data unit utilizing the units of measurement for both the first and second domain-specific data units.

19. The system according to claim 12, wherein the analysis module normalizes at least one of the two or more data units before the step of encoding.

20. A non-transitory computer readable storage media having a program embodied thereon, the program being executable by a processor to perform a method generating pluggable domain-specific data types, the method comprising:
determining a schema for the domain-specific data type, the schema including a data protocol that defines how data units are to be encoded into a domain-specific data unit and locations of a plurality of acceptable data sources, the domain-specific data unit including a first data unit having a first unit of measure and a second data unit having a second unit of measure, the first and second data units, assigning a third unit of measure to the domain-specific data unit, the third unit of measure based upon the first and second units of measure
generating the domain-specific data type utilizing the determined schema, the domain-specific data type having a pluggable format and including instructions that instruct a third party legacy application in the creation and utilization of domain-specific data units, such that the domain-specific data type may be utilized by the third-party legacy application; and
storing the domain-specific data type in a pluggable domain-specific data type library the pluggable domain-specific data type being at least one of transferable to other applications or incorporable into other domain-specific data type libraries.

* * * * *